United States Patent [19]

McQueen

[11] Patent Number: 4,648,554

[45] Date of Patent: Mar. 10, 1987

[54] IMPACT AND VIBRATION ATTENUATING PAD WITH OFFSET DIMPLES

[75] Inventor: Phillip J. McQueen, Ignacio, Calif.

[73] Assignee: Acme Plastics, Inc., Indiantown, Fla. ; a part interest

[21] Appl. No.: 666,442

[22] Filed: Oct. 30, 1984

[51] Int. Cl.$^4$ .............................................. E01B 9/68
[52] U.S. Cl. .................................. 238/283; 267/141; 238/382
[58] Field of Search ................... 238/6, 7, 8, 283, 310, 238/382; 267/136, 141, 153; 428/165–167, 169, 159, 180; 188/268; 248/560, 562, 633, 634

[56] References Cited

U.S. PATENT DOCUMENTS

| | | | |
|---|---|---|---|
| 2,032,114 | 2/1936 | Clements et al. | 428/172 |
| 2,087,248 | 7/1937 | Fischer | 428/166 |
| 3,026,224 | 3/1962 | Rogers, Jr. | 267/153 |
| 3,142,599 | 7/1964 | Chavannes | 428/180 X |
| 3,311,331 | 3/1967 | Steimen | 267/63 R |
| 3,560,237 | 2/1971 | Miller | 427/44 |
| 3,920,183 | 11/1975 | Houghton | 238/283 |

FOREIGN PATENT DOCUMENTS

| | | | |
|---|---|---|---|
| 576801 | 6/1959 | Canada | 428/166 |
| 1014139 | 8/1957 | Fed. Rep. of Germany | 238/283 |
| 1479936 | 3/1969 | Fed. Rep. of Germany | 428/159 |
| 1211567 | 3/1960 | France | 238/283 |
| 52390 | 5/1966 | German Democratic Rep. | 238/283 |
| 841776 | 7/1960 | United Kingdom | 238/283 |
| 946936 | 1/1964 | United Kingdom | 238/283 |

Primary Examiner—Robert B. Reeves
Assistant Examiner—Scott H. Werny
Attorney, Agent, or Firm—Phillips, Moore, Lempio & Finley

[57] ABSTRACT

An elastomeric pad, particularly adapted for placement between a prestressed concrete railroad tie and a supported rail, comprises a plurality of dimples formed on opposite sides of the pad in predetermined patterns to attenuate impact and vibrational forces imposed thereon. The centers of the dimples formed on one side of the pad are offset longitudinally and laterally relative to the centers of the dimples formed on the opposite side of the pad to form a network of interlocked arch bridge portions when the pad is viewed in cross-section and such that a majority of dimples on the opposite side underlies and is substantially tangential to four overlying dimples of the one side when the pad is viewed in plan. The pad functions to distribute compressive stresses substantially uniformly throughout and within the elastic limits of the pad when impact loads are imposed thereon.

20 Claims, 5 Drawing Figures

IMPACT AND VIBRATION ATTENUATING PAD WITH OFFSET DIMPLES

DESCRIPTION

1. Technical Field

This invention relates generally to an elastomeric load bearing pad adapted to attenuate impact and vibrational forces imposed thereon by a supported member and more particularly to a tie pad adapted for use between a railroad tie and a supported rail.

2. Background Art

The advent of the prestressed concrete railroad tie has given rise to the problem of flexural cracking at the railseat area of the tie when high impact loads are imposed thereon. Prolonged imposition of such loads on the tie, if not suitably controlled, can result in propagation of the cracks which eventually results in structural failure of the tie and/or loosening of the fastening system utilized to secure a rail to the tie. In addition, the loads can cause degradation of the road bed. The severe impact loads imposed on the rail and tie are usually derived from wheel tread defects, such as flats and spalls, eccentricities of the wheel due to wear, and rail anomalies, such as engine burns, corrugations, spalls, shelling, joints, chips and the like.

The above problems become more pronounced than normal in the North American railraod systems since such systems experience relatively high static axle loads in the order of 36 to 41 tons. Current concrete tie design loading criteria, as required by the American Railway Engineering Association's "Manual of Railway Engineering, Chapter 10, Concrete Ties," calls for an applied wheel-rail load of 41 kips to be considered with each tie carrying 60% of such load. An impact factor of 150% is then applied, thus resulting in a tie-railseat load of 61.5 kips. This load factor is then used in the determination of design flexural capacity and hardware and a series of qualification tests are specified in the above-referenced Chapter 10 to confirm that the concrete tie and rail fastening system will meet the specified performance criteria.

One prior art solution to reducing impact loading on the tie has been an attempt to eliminate wheel flats, eccentricities and rail anomalies in the railroad system. Although improvements in this direction continue to be made, the size of the task is obviously prodigious since approximately 250,000 miles of track and 1.7 million vehicles having 6.8 million axles are involved. Thus, it becomes obvious to those skilled in the art relating hereto that the high impact loading problem will prevail well into the future and will require other solutions.

A second prior art solution to the impact loading problem has been to mount an elastomeric pad between the tie and rail in an attempt to attenuate impact loads and vibrational energy resulting from the passage of railroad vehicles over the rail. In addition, the pad functions as a bearing pad to accommodate imperfections in the fit between the steel rail and the concrete railseat of the tie and also aids in controlling abrasion of the tie, i.e., if abraded, the pad can be replaced before the concrete railseat is damaged.

Early conventional tie pads were usually composed of either polyethylene, wood or corded rubber, while later pads were composed of either ethylene vinyl acetate (EVA), nylon, rubber-cork compounds or neoprene rubber. Following European practice, the pads were sometimes grooved to provide a shape factor therefor. Under test, the rubber and neoprene pads tended to fail when subjected to United States railraod axle loading requirements as they tended to squeeze-out from under the rail and often migrated from the railseat area. The polyethylene or EVA pads tended to exhibit a somewhat better ability to stay in position and last longer then the earlier tested pads. Although conventional pads of the above type have shown some improvement in the attenuation of impact loads and vibrational energy, they have not fully solved the above discussed problems.

In particular, a recent report issued by the U.S. Department of Transportation, Federal Railway Administration, Office of Research and Development ("Laboratory Study to Determine the Effects of Tie Pad Stiffness on the Attenuation of Impact Loads in Concrete Railroad Ties, Report No. FRA/ORD-82-19) noted that while a reduction of tie pad stiffness can reduce the strain resulting from impact loads, the stiffness measurements of the above discussed conventional pads did not provide a reliable measure of impact attenuation properties.

DISCLOSURE OF INVENTION

This invention overcomes the above, briefly described problems of the prior art by providing a highly efficient elastomeric pad that will meet the design requirements of the railroad tie industry, particularly in the North American railway systems. In particular, the pad of this invention will meet prescribed design criteria, including electrical insulation, abrasion, durability and impact loading and vibration attenuation within specified and required performance criteria.

It is expected that the ability of the pad to achieve the prescribed design objectives will have a significant influence on the future acceptance of the concrete tie in the North American railroad systems which are subjected to relatively high impact loading. The use of the cost effective strain attenuating railseat tie pads of this invention can be viewed as not only assisting in the achievement of lower life cycle costs for the concrete ties, but also reduces the initial cost of the tie. In particular, it is believed that this invention will result in a reduction of the present size of mainline concrete ties, thus making it possible to reduce the volume of concrete and the quantity of prestressed steel used in each tie. In addition, a reduction of the composite weight of the tie will result in lower transportation and installation costs.

Although particularly useful in combination with prestressed concrete railroad ties, it should be understood that the pad of this invention has application to other types of railroad ties, such as those composed of wood or steel. In addition, the pad is adapted for use in any "direct" or "indirect" load bearing application wherein it proves desirable to attenuate impact loads and absorb vibrational energy of a supported mass. For example, the pad could be used as a bearing pad under concrete or steel girders in building or bridge structures and under standard machinery.

The generally flat impact and vibration attenuating pad of this invention is composed of an elastomeric material and comprises a plurality of spaced apart first dimples formed in an at least generally regular pattern on a first side of the pad and interconnected by a plurality of first flat portions. A plurality of spaced apart second dimples are also formed in an at least generally regular pattern on a second opposite side of the pad and are interconnected by a plurality of second flat portions. Centers of the first dimples are offset longitudinally and laterally relative to centers of the second dimples to form a network of interlocked arch bridge portions when the pad is viewed in cross-section cutting through the first and second dimples. This structural arrangement will function to distribute compressive stresses substantially uniformly throughout and within the elastic limits of the pad when impact loads are imposed thereon.

BRIEF DESCRIPTION OF THE DRAWINGS

Other objects and advantages of this invention will become apparent from the following description and accompanying drawings wherein.

BEST MODE OF CARRYING OUT THE INVENTION

Figure 1:
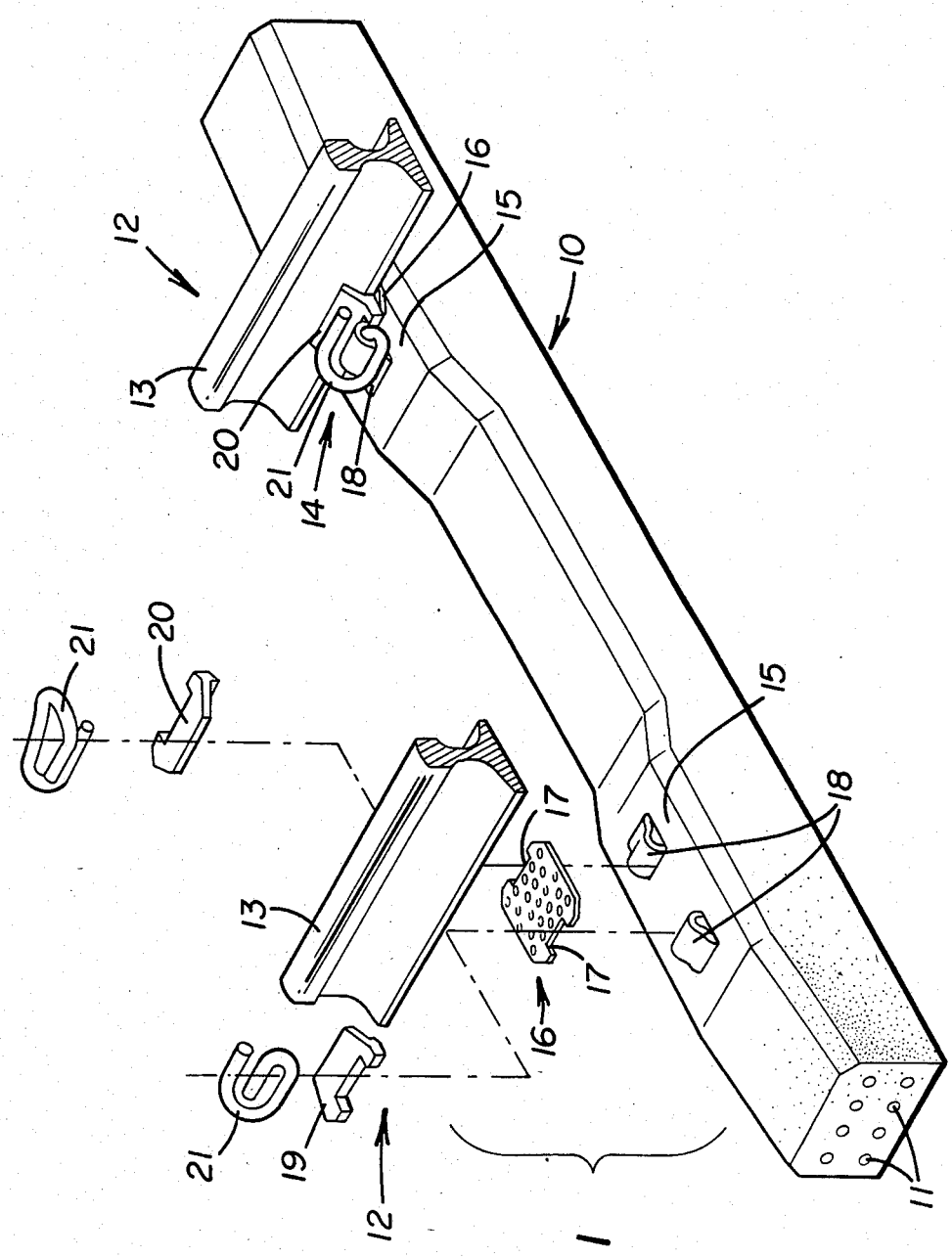
FIG. 1 is an isometric view illustrating a concrete railroad tie having a rail mounting system assembled on one end thereof and an identical rail mounting system shown unassembled and exploded on an opposite end thereof to more clearly illustrate component parts thereof.

FIG. 1 illustrates a standard concrete railroad tie 10 suitably reinforced with prestressed steel strands 11. A rail mounting system 12 releasably mounts a steel rail 13 on each end of the tie and includes a fastening system 14 for this purpose. A plurality of such ties are placed on level ballast at the correct spacing with the longitudinal axis of each tie being disposed 90° relative to the center line of the composite track in a conventional manner.

Each rail mounting system 12 is assembled by first cleaning a railseat area 15 with a broom or airgun, placing a tie pad 16 of this invention on the railseat area, and setting and aligning rail 13 on the tie pad. The pad has notches 17 formed on opposite lateral edges thereof to permit the pad to straddle a pair of longitudinally spaced clip entries and retainers 18, embedded in the tie during manufacture to form an integral part thereof. A pair of electrical field and gauge insulators 19 and 20, respectively, are then mounted on the tie pad in overlying relationship on the inner and outer toes of rail 13, as typified by assembled gauge insulator 20.

Since all modern railway systems use electrical circuits in the track rail for the purpose of signal and train control, tie pad 16 and insulators 19 and 20 function to electrically isolate rail 13 from tie 10, as well as from steel retainers 18 and steel clips 21. The insulators may be composed of nylon or other suitable material that will meet the functional requirements of electrical insulation, abrasion resistance and durability.

Clips 21 are then inserted into their respective retainers 18, in the manner shown by the assembled clip in FIG. 1, with the flat toe portion of the clip bearing on the top of the underlying insulator to aid in retaining it in position. A heavy hammer is normally utilized to drive the clip into its retainer. The clip may be of the so-called Pandrol "e" type, commonly used for this purpose.

In addition to electrically isolating rail 13 from tie 10, pad 16 further functions as a bearing pad to accommodate imperfections in the fit between the rail and tie, prevents abrasion of railseat area 15 and substantially attenuates impact loads and vibrational energy normally transmitted from rail 13 to tie 10 during the passage of railroad vehicles there over. As described above, such impact loads can become very severe and are usually derived from wheel tread defects and/or rail anomalies. As described more fully in detail hereinafter, a fundamental function of pad 16 is to attenuate the impact loading imposed thereon to a level less than that required to form cracks in the tie to thus substantially increase the service life of the tie and underlying road bed. The pad functions to absorb and distribute compressive stresses substantially uniformly therethrough and well within the elastic limits of the pad when impact loads are imposed thereon.

Figure 2:
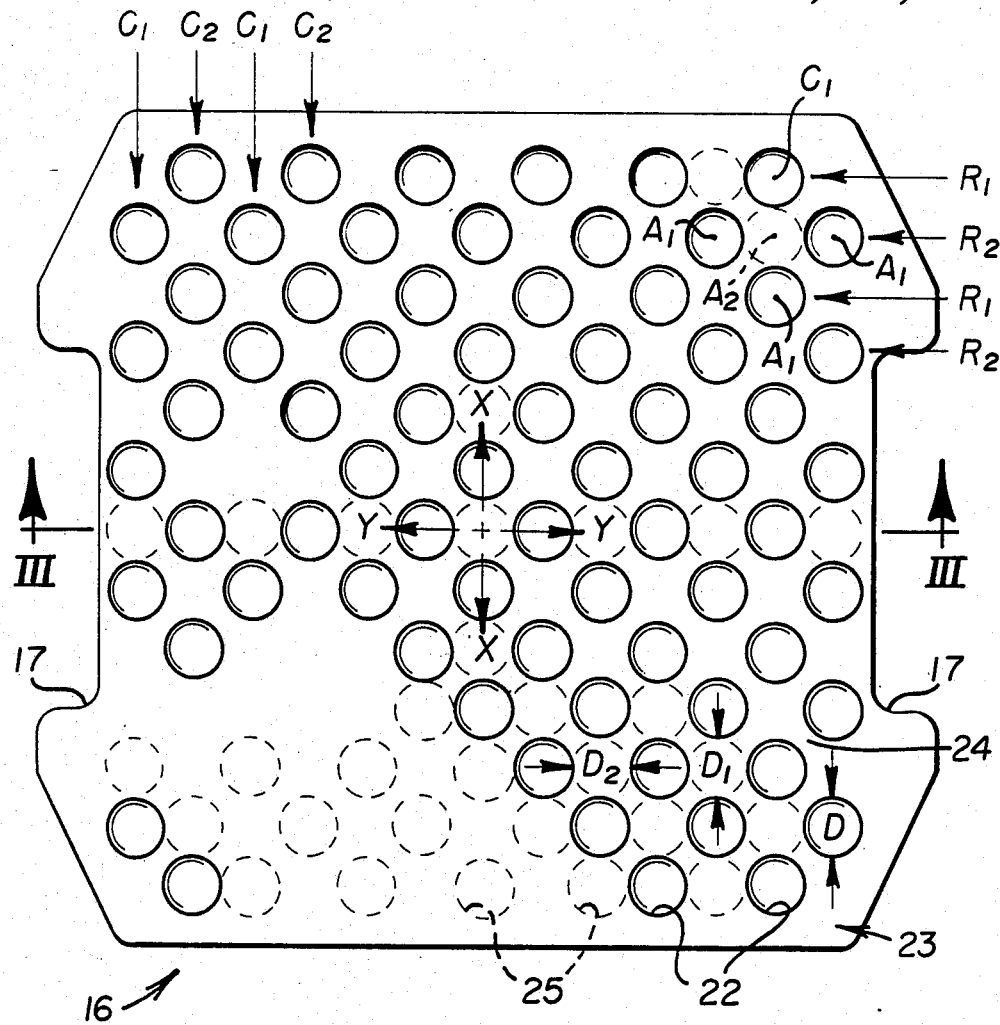
FIG. 2 is a top plan view of a tie pad embodying this invention and employed in each of the rail mounting systems of FIG. 1.
Figure 3:
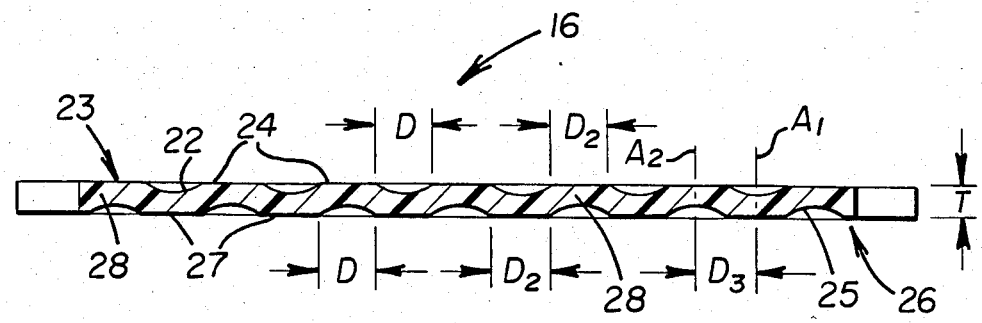
FIG. 3 is a cross-sectional view through the tie pad, taken in the direction of arrows III—III in FIG. 2.

Referring to FIGS. 2 and 3, tie pad 16 is generally flat and is composed of an elastomeric material that is electrically insulative, abrasion resistant, durable and functions to attenuate impact strain energy within specified limits. As shown, the pad comprises a plurality of spaced apart first dimples 22 preferably formed in a regular pattern on a first side 23 of the pad and interconnected by a plurality of intermediate flat portions 24. A plurality of spaced apart second dimples 25 are formed in a like manner on an opposite, second side 26 of the pad and are interconnected by a plurality of intermediate second flat portions 27. Although some of the dimples have been omitted in FIG. 2, it should be understood that the patterns of the dimples are uniform throughout the entire first and second sides of the pad.

As shown in both FIGS. 2 and 3, centrally disposed axes $A_1$ of first dimples 22 are offset both longitudinally (in the direction of axis X—X in FIG. 2) and laterally (in the direction of axis Y—Y in FIG. 2) relative to corresponding axes $A_2$ of second dimples 25. As shown in FIG. 3, this arrangement thus forms a network of interlocked arch bridge portions 28 whereby compressive stresses are distributed substantially uniformly throughout the pad and well within the elastic limits thereof when an impact load is imposed thereon. As shown in FIG. 2, first dimples 22, for example, comprise a plurality of first columns $C_1$ of dimples and a plurality of second columns $C_2$ of dimples with each second column of dimples being disposed in spaced apart relationship between a pair of adjacent first columns of dimples.

The first and second columns of dimples are further disposed in parallel relationship relative to each other with the dimples in each column being disposed in linear and equally spaced relationship relative to each other. As further illustrated in FIG. 2, first dimples 22 are arrayed to comprise a plurality of parallel first rows $R_1$ which also compose dimples of second columns $C_2$ with the columns and rows being disposed in perpendicular relationship relative to each other. A plurality of parallel second rows $R_2$ of dimples 22, also composing first columns $C_1$, are each disposed between a pair of adjacent first rows $R_1$. As suggested above, second dimples 25 formed on second side 26 of the pad are arrayed in the same manner, except for the offset relationship as between axes $A_1$ and $A_2$ of the first and second sets of dimples, respectively.

Still referring to FIGS. 2 and 3, each dimple 22 and 25 defines a semi-spherical concavity in a respective side of the pad. Although other shapes and arrays of the dimples can be used, the semi-spherical shape and regular arrays of the dimples are preferred. As further shown in FIG. 2, each of the first and second dimples defines a circle on the respective surface of the pad with the circle defined by first dimple 22, for example, having a diameter D that is preferably equal to a separation distance $D_1$ between each adjacent pair of circles in each column $C_1$ and $C_2$ of the circles.

In addition and as shown in FIGS. 2 and 3, the diameter of the circle defined by dimple 22 is also preferably equal to a separation distance $D_2$ between each adjacent pair of dimples in each row $R_1$ and $R_2$ of the circles. As further shown in FIG. 2, a majority of dimples 22 of second columns $C_2$ are each disposed intermediate four dimples of a pair of adjacent first columns $C_1$ of the dimples. Longitudinal axes $A_1$ and $A_2$ of dimples 22 and 25, respectively, are preferably separated by a distance $D_3$ that is equal to the diameter D of each circle of the dimples.

The same array of second dimples 25 on opposite, second side 26 of the pad, preferably places a majority of the second dimples in underlying and tangential relationship relative to four overlying dimples 22, as shown in FIG. 2. As illustrated in FIG. 3, the structural relationship of dimples 22 and 25 and flat portions 24 and 27 will thus form a network of interlocked and alternately reversed arch bridge portions 28 that will tend to flex when a load is imposed on the pad whereby vertical compressive forces are directed substantially uniformally radially and tangentially into the "supports" for the bridge portions i.e., flat portions 24 and 27 of the pad.

Various elastomeric materials may be utilized to compose the pad with one specific example being DuPont's Elvax, an Ethylene Vinyl Acetate (EVA) copolymer resin having the desired elastomeric properties. This material exhibits excellent flexibility and toughness at low temperatures and may be purchased in a variety of grades, such as 360, 460, 560, etc., the numerical code indicating the percentage of vinyl acetate present in the compound. The ability of this material to be molded easily makes it an ideal material for pads 16. It should be understood that other materials, such as synthetic and natural rubbers, plastic materials, such as polyethylene, polyurethane or the like, could be utilized for the pad so long as such material exhibits the desired mechanical and chemical properties discussed above.

The inter-relationships between the material composing the pad, the dimensions of the pad, the shape factor of the pad, primarily controlled by the shape, size, depth and spacing of the dimples, and related design considerations, can, of course, be varied to meet specific test and field service requirements.

In tie pad applications of the type illustrated in FIG. 1, the pad preferably exhibits the following mechanical properties and dimensions: a durometer hardness in the range of from 55 to 85; a spring rate in the range of from 500,000 lb./in. to 2,500,000 lb./in.; a length and a width in the directions of axes X—X and Y—Y in FIG. 2, respectively, in the range of from 5.0 ins. to 9.0 ins.; a thickness T in the range of from 0.15 in. to 0.75 in.; a maximum diameter D for dimples 22 and 25 of from 0.2 in. to 0.75 in.; and a maximum depth of each dimple at its center of from 0.03 in. to 0.15 in.

Although one specific embodiment of dimple arrays 22 and 25 has been illustrated, it should be understood that variances thereof may be made for particular tie pad applications without departing from the scope and spirit of this invention. For example, loading data on a particular tie pad may suggest that the dimples in the center of the pad be more closely spaced apart (shortened separation distance $D_2$ in FIG. 3) whereas dimples disposed radially outwardly thereform be separated from each other at a greater separation distance $D_2$, i.e., separation distance $D_2$ can vary. The dimples, each having arcuate shapes throughout its various cross-sections, could also have geometric configurations other than semi-spherical, e.g., frusto-conical. Also, diameter D could vary from dimple to dimple in a particular pad and at least some of the dimples 22 and 25 could overlap relative to each other rather than maintain the tangential relationships shown in FIG. 3. Certain surface portions of a particular pad, such as peripheral portions, could be formed "dimpleless," i.e., with substantial flat surfaces on side 23 and/or 26. The spacing of the dimples along one or both axes X—X and Y—Y can also be varied and the axes can be aligned at an angle other than 90°, if so desired. However, in any of the above variances, at least a substantial portion of second dimples 25 would find their axes $A_2$ (FIG. 3) offset relative to axes $A_1$ of first dimples 22, in the manner described above.

Figure 5:
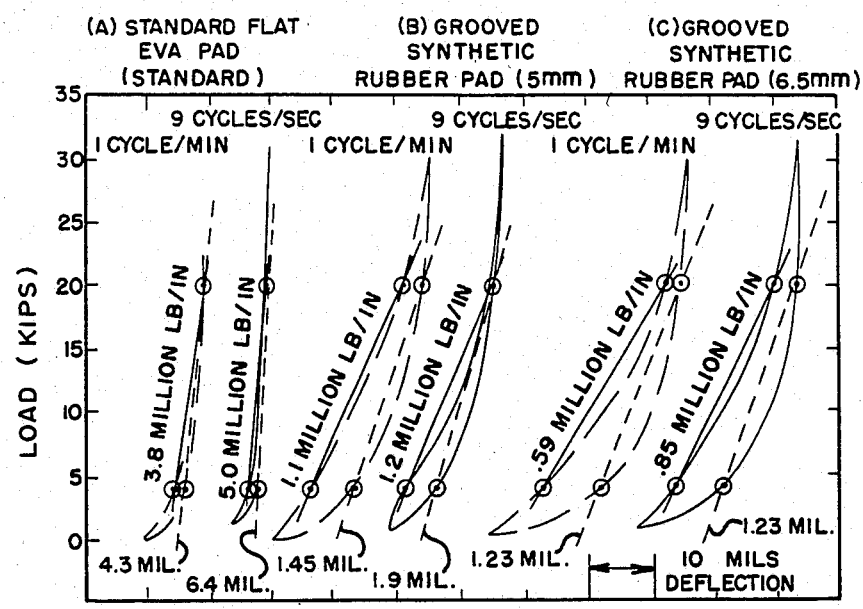
FIG. 5 graphically illustrates comparative tests conducted on three different prior art tie pads.
Figure 4:
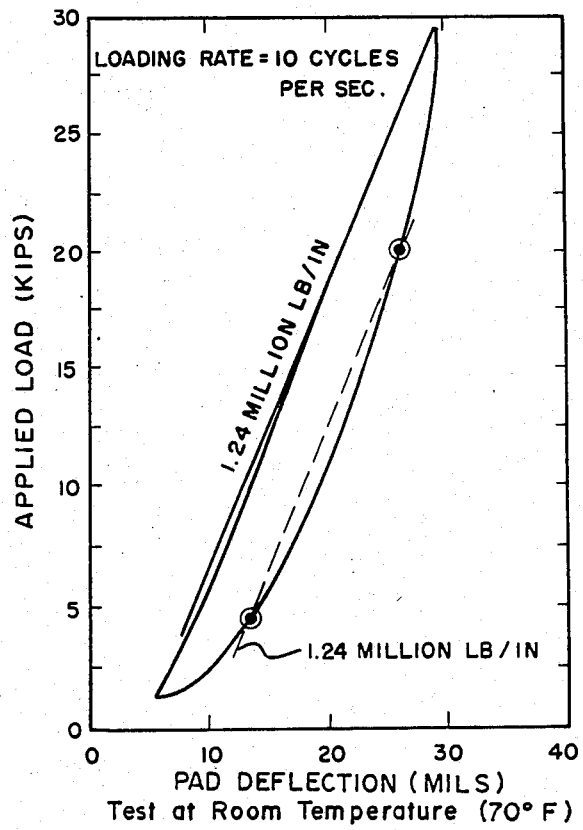
FIG. 4 graphically illustrates test results conducted on a tie pad embodiment of this invention.

Comparative Tests of Tie Pad 16 (FIGS. 4 and 5)

FIG. 4 graphically illustrates typical dynamic load-deflection curves for a tie pad embodiment of this invention, tested under laboratory conditions. The specified spring rate required was from 1.0 to 1.25 million lbs./in. Such stiffness range is specified by AMTRAK for pads to be installed in the North East corridor of the United States. The laboratory tests were conducted on pads composed of DuPont Elvax 460 and comprised the following dimensions: a length in the direction of axes X—X in FIG. 2 of 7.0 ins.; a maximum width in the direction of axes Y—Y of 6.63 ins.; a depth of each notch 17 of 0.56 in.; a thickness T of 0.256 in.; a diameter D (as well as dimensions $D_1$, $D_2$ and $D_3$) of 0.5 in.; and a maximum depth of each dimple 22 and 25 at its center of 0.06 in.

The pads were irradiated, which is a curing process that exposed the thermoplastic pad material to high energy electrons. Such exposure was found to have little, if any, effect on the pad's spring rate, but tended to increase its softening point, density and tensile strength. Vicant softening temperature and compression set improved substantially and the pad exhibited increased resistance to creep and flow, even at elevated temperatures. Laboratory testing indicated no meaningful difference in performance between the irradiated pad and the non-irradiated pad which led to the conclusion that the irradiated pad need only be used to satisfy high temperature requirements in certain tie pad applications.

As shown in FIG. 4, the curve shape and gradient depicts excellent linearity and impact attenuation reduction values in excess of 25%. It was concluded that the inter-relationship between material properties, pad dimensions and the pad shape factor, primarily controlled by the shapes and dimensional parameters and spacing of the dimples, provided basic design criteria whereby specific performance desiderata can be engineered into the pad to meet specific tests and field service requirements. It was further concluded that the tie pad of this invention constitutes a marked improvement over conventional pad designs which rely almost exclusively on material properties, with little, if any, emphasis (e.g., grooved pads) having been directed to shape factoring of the pad. Thus, conventional pads, such as the types of tested pads illustrated in FIG. 5, exhibit critical limitations in terms of meeting the range of loading, operating and environmental conditions prevalent in the operation of railroad track systems.

On one hand, a "stiff" pad may stay in position on the railseat and exhibit relatively good wearing characteristics, but have little or no impact and vibration absorbing properties. On the other hand, a "soft" pad may have excellent impact and vibration absorbing properties but will behave poorly in respect to maintaining position on the railseat and will not exhibit the desired dimensional distortion characteristics. The ideal pad, therefore, combines the desirable properties of both "stiff" and "soft" pads, i.e., as in the subject invention, it should have dimensional stability as well as impact and vibration absorbing qualities.

The above tests, as well as those tests conducted on conventional pads of the type referenced in FIG. 5, were conducted on a laboratory test rig that closely simulated the wave form of dynamic loading corresponding to that experienced in field applications and testing. In particular, the test rig comprised a tie pad mounted between a standard concrete railroad tie and a steel rail. The tie was mounted on longitudinally spaced neoprene strips which, in turn, were mounted on a stationary floor. An impact hammer ("applied load") imposed impact loads on the rail sequentially through a resilient shim (neoprene) and an impact head engaging the rail. A standard strain gage was secured to the tie, vertically below the impact hammer and tie, to measure pad deflection.

Referring to FIG. 5, conventional tie pads (B) and (C) were tested in the above-described laboratory rig and can be compared with applicant's pad and a "standard" flat rigid pad made of EVA (A). The thickness of the tested pads ranged from 5 mm to 9 mm with a "practical" limitation being placed on the pad thickness of 6.5 mm, as this dimension was dictated by the deflecting limits of the existing spring clips. Within this range, it was found that a reduction of impact strain of 25% was possible while a maximum attenuation of impact strain of 40% was possible with a grooved pad having a 9.0 mm thickness. The soft rubber grooved pad, however, has functional limitations as discussed herein.

Pad stiffness was then measured by means of a compression testing machine. Load-defection curves were plotted and the stiffness was defined as the slope of a line connecting points on the curve at 4,000 lb. and 20,000 lb. (FIG. 5). For each pad a "static" test was performed at 1.0 cycle per minute and a "dynamic" test at 9.0 cycles per second (Hz). FIG. 5 shows typical load-deflection curves for some of the pads tested, in this case grooved synthetic rubber pads (B) of 5.0 and 6.5 mm thickness compared with the "standard" flat, EVA pad (A) of 5.0 mm thickness. As shown, the defined spring rates vary from a maximum of 3.8 million lb/in to a minimum of 0.59 million lb/in in the "static" case and from a maximum of 5.0 million lb/in to a minimum of 0.85 million lb/in in the "dynamic" case.

A report entitled "Laboratory Study to Determine the Effects of Tie Pad Stiffness on the Attenuation of Impact Loads in Concrete Railway Ties" was issued by the U.S. Department of Transportation, Federal Railway Administration, Office of Research and Development, number FRA/ORD-82/19. The information and data contained in this report was carefully reviewed and used as a basis of development of applicant's "double dimple" tie pads. The report noted that while a reduction of tie pad stiffness can reduce the strain resulting from impact loading the stiffness measurements of flexible pads do not provide a reliable measure of impact attenuation properties. Inspection of the curves of FIG. 5 appear to suggest a reason for the lack of a direct relationship between actual impact attenuation and spring rate. It is hypothesized that these "soft" pads, when installed in a railroad track system and subjected to rapidly applied loads due to a heavy fast train, will act as "hard" pads as the loading point will be high on the load deflection curve and, therefore, the pads will exhibit a relatively high spring rate.

In addition, the curves indicate a hysteresis effect between increasing loads and decreasing loads. This effect is least noticeable on the "stiff" pads (A) and most noticeable on the "soft" pads (C). If the defined spring rate is calculated for the decreasing loading condition, noticeable increases in spring rate occur with the softer pads. The report does not mention this effect, but it should be considered as a complete load cycle of pads installed in a railroad track system includes loading and unloadings during the passage of vehicles.

Another seemingly important consideration is the shape of the curves. The crescent moon or "banana shaped" curves show widely varying spring rates, as can be calculated by drawing a tangent to the curve at any point. In addition, the "soft" pad curves (B) and (C) show dramatically increasing stiffnesses as the load increases. Since average railseat loads are in the order of 30 to 40 kips and the dynamic loads, considerably more, a desirable feature of any tie pad performance would be that the stiffness remain relatively constant over the load range and, therefore, provide impact absorbing deflection at the top end of the scale, as well as at the lower end thereof. FIG. 4, depicting performance data on the pad of this invention, satisfies these requirements.

The effectiveness of the "double dimple" design feature of this invention can be seen by comparing the load-deflection curves for the standard flat EVA pad, FIG. 5, item (A) with the double dimple EVA pad, FIG. 4. The material used in the manufacture of both of these pads was essentially the same yet the shape factoring provided by the double dimple design results in a reduction of the spring rate from 5.0 million lbs. per inch to 1.24 million lbs. per inch in the dynamic case, with a strain attenuation value reduction of more than 25% of that measured for the standard flat EVA pad.

I claim:

1. A generally flat, impact and vibration attenuating pad for railways, entirely composed of the same elastomeric material and disposed in a horizontal plane, for attenuating dynamic impact and vibrational loads imposed thereon when placed between a railroad tie and a steel rail, comprising a plurality of spaced apart first dimples formed in a generally regular pattern on a first side of said pad and interconnected by a plurality of first flat portions, and a plurality of spaced apart second dimples formed in a generally regular pattern on an opposite second side of said pad and interconnected by a plurality of second flat portions, each of said first and second dimples having arcuate shapes throughout its various cross-sections and centers of said first dimples being offset longitudinally and laterally relative to centers of said second dimples such that a majority of said second dimples underlies and is substantially tangential relative to four overlying first dimples when said pad is viewed in plan to form means, defining a network of interlocked arch bridge portions when said pad is viewed in cross-section, for redirecting impact loads, resulting from dynamic loading, imposed on said pad in a vertical plane, perpendicular to said horizontal plane, radially into said horizontal plane and as compressive stresses distributed substantially uniformly throughout and within the elastic limits of said pad.

2. The pad of claim 1 wherein each of said first and second dimples comprises a plurality of first columns of dimples and a plurality of second columns of dimples, each said second column of dimples being laterally disposed in spaced apart relationship between a pair of adjacent first columns of dimples.

3. The pad of claim 2 wherein said first and second columns of dimples are disposed in parallel relationship relative to each other.

4. The pad of claim 2 wherein the dimples of each of said first and second columns of dimples are disposed in linear and equally spaced relationship relative to each other.

5. The pad of claim 2 wherein a majority of dimples of said second column of dimples are disposed intermediate four dimples of said pair of adjacent first columns of dimples when said pad is viewed in plan.

6. The pad of claim 1 wherein each said dimple generally defines a semi-spherical concavity.

7. The pad of claim 6 wherein each of said first and second dimples comprises a plurality of parallel and longitudinally disposed first columns of dimples and a plurality of parallel and longitudinally disposed second columns of dimples, each of said first and second dimples defining a circle on the surfaces of the respective first and second sides of said pad, the circle defined by each of said first and second dimples having a diameter at least substantially equal to a separation distance between each adjacent pair of circles in a respective column of circles.

8. The pad of claim 7 wherein each of said first and second dimples further comprises a plurality of parallel first rows of dimples composed of said second columns of dimples and disposed in perpendicular relationship relative to said first and second columns of dimples and a plurality of parallel second rows of dimples composed of said first columns of dimples also disposed in perpendicular relationship relative to said first and second columns of dimples.

9. The pad of claim 8 wherein the diameter of the circle defined by each of said first and second dimples is at least substantially equal to the separation distance ($D_2$) between each adjacent pair of circles in a respective row of circles.

10. The pad of claim 7 wherein said pad is generally rectangular and has a length and width each selected from the approximate range of from 5.0 ins. to 9.0 ins. and a thickness in the approximate range of from 0.15 in. to 0.75 in.

11. The pad of claim 10 wherein the elastomeric material composing said pad is selected from the group consisting of ethylene vinyl acetate, polyethylene, polyurethane, neoprene and natural rubber.

12. The pad of claim 10 wherein the diameter of said circle is selected from the approximate range of from 0.25 in. to 0.75 in.

13. The pad of claim 12 wherein the maximum depth of each said dimple at its center is selected from the approximate range of from 0.03 in. to 0.15 in.

14. The pad of claim 12 wherein the length, width, and thickness of said pad at least closely approximates 7.0 in., 7.75 in. and 0.25 in., respectively.

15. The pad of claim 14 wherein the diameter of said circle and the maximum depth of each said dimple at its center closely approximate 0.5 in. and 0.06 in., respectively.

16. The pad of claim 1 wherein said elastomeric material has a durometer hardness selected form the approximate range of from 55 to 85 and wherein when a static load of 30,000 lbs. is imposed on said pad, said pad exhibits direct compression stresses not exceeding 1,500 psi and total dynamic deflection not exceeding 0.03 in.

17. The pad of claim 1 further comprising a load bearing member having said pad mounted on an upper surface thereof and a load imposing member mounted on said pad.

18. The pad of claim 17 wherein said load bearing member constitutes a railroad tie and said load imposing member constitutes a steel rail.

19. The pad of claim 18 further comprising a pair of retaining means for releasably attaching opposite sides of said rail on said tie and notch means formed on opposite lateral edges of said pad for straddling said retaining means.

20. The pad of claim 1 wherein said pad is irradiated within the range of approximately 5.0 to 17.0 Mrads.

* * * * *